(12) United States Patent
Fukuya et al.

(10) Patent No.: US 8,437,613 B2
(45) Date of Patent: May 7, 2013

(54) CONTENT DISPLAY CONTROL APPARATUS, METHOD THEREFOR, PROGRAM THEREFOR, AND RECORDING MEDIUM THEREFOR

(75) Inventors: Katsunari Fukuya, Tokyo (JP); Muneaki Osawa, Chiba (JP); Kazuo Yamaoka, Tokyo (JP); Hiroshi Aruga, Tokyo (JP); Akira Ando, Kanagawa (JP); Eriko Matsumura, Kanagawa (JP); Fuyuki Matsuyama, Tokyo (JP); Nobuhiro Inoue, Kanagawa (JP); Sadamichi Bamba, Kanagawa (JP); Yukiko Akiyama, Tokyo (JP); Shinya Miyoshi, Tokyo (JP)

(73) Assignee: Sony Corporation (JP)

( * ) Notice: Subject to any disclaimer, the term of this patent is extended or adjusted under 35 U.S.C. 154(b) by 671 days.

(21) Appl. No.: 12/653,817

(22) Filed: Dec. 21, 2009

(65) Prior Publication Data
US 2010/0166390 A1    Jul. 1, 2010

(30) Foreign Application Priority Data

Dec. 26, 2008    (JP) ................................ P2008-332134

(51) Int. Cl.
*H04N 5/92*    (2006.01)
(52) U.S. Cl.
USPC ........................................................ 386/244
(58) Field of Classification Search ................ 386/239, 386/244, 245, 246, 278
See application file for complete search history.

(56) References Cited

U.S. PATENT DOCUMENTS

| 7,440,682 | B2 | 10/2008 | Habuta et al. | |
|---|---|---|---|---|
| 2004/0193423 | A1* | 9/2004 | Nagae et al. | 704/266 |
| 2006/0062552 | A1 | 3/2006 | Lesser et al. | |
| 2008/0292272 | A1* | 11/2008 | Yamazaki et al. | 386/95 |
| 2009/0073314 | A1* | 3/2009 | Uemukai et al. | 348/468 |

FOREIGN PATENT DOCUMENTS

| EP | 1976277 A1 | 10/2008 |
|---|---|---|
| JP | 09135386 A | 5/1997 |
| JP | 2001242844 A | 9/2001 |
| JP | 2005244407 A | 9/2005 |
| JP | 2005-341512 A | 12/2005 |
| JP | 2007135013 A | 5/2007 |

OTHER PUBLICATIONS

European Search Report EP 09180497, dated May 26, 2011.
Office Action from Japanese Application No. 2008-332134, dated Dec. 16, 2010.

* cited by examiner

*Primary Examiner* — Tat Chio
(74) *Attorney, Agent, or Firm* — Lerner, David, Littenberg, Krumholz & Mentlik, LLP

(57) ABSTRACT

A content display control apparatus includes control functions, in which, a content is obtained, data associated with a character string corresponding to the content is obtained, the character string associated with the data is segmented into a line in accordance with a criterion determined in advance, a display duration time of the character string is set on a line-by-line basis, the segmented line is sequentially superimposed and displayed in accordance with the corresponding display duration time set thereby, the number of characters included in the segmented line is counted, a period of time corresponding to the counted number of characters is calculated, the calculated period of time is set as the display duration time corresponding to the segmented line, and subsequent to completion of displaying of the segmented line of the character string corresponding to the obtained content, a different content is displayed.

12 Claims, 14 Drawing Sheets

FIG. 8

| COMMENT 1 | NUMBER OF CHARACTERS | CALCULATED TIME | MINIMUM DISPLAY DURATION TIME | LINE-BY-LINE BASED DISPLAY DURATION TIME |
|---|---|---|---|---|
| FIRST LINE | 32 | 1.6 | 3.0 | 3.0 |

| COMMENT 2 | NUMBER OF CHARACTERS | CALCULATED TIME | MINIMUM DISPLAY DURATION TIME | LINE-BY-LINE BASED DISPLAY DURATION TIME |
|---|---|---|---|---|
| FIRST LINE | 71 | 3.6 | 3.0 | 3.6 |
| SECOND LINE | 67 | 3.4 | 3.0 | 3.4 |

FIG. 11

| COMMENT 1 | NUMBER OF CHARACTERS | CALCULATED TIME | MINIMUM DISPLAY DURATION TIME | LINE-BY-LINE BASED DISPLAY DURATION TIME |
|---|---|---|---|---|
| FIRST LINE | 10 | 2.0 | 3.0 | 5.0 |

| COMMENT 2 | NUMBER OF CHARACTERS | CALCULATED TIME | MINIMUM DISPLAY DURATION TIME | LINE-BY-LINE BASED DISPLAY DURATION TIME |
|---|---|---|---|---|
| FIRST LINE | 15 | 3.0 | 3.0 | 5.0 |

CONTENT DISPLAY CONTROL APPARATUS, METHOD THEREFOR, PROGRAM THEREFOR, AND RECORDING MEDIUM THEREFOR

CROSS-REFERENCE TO RELATED APPLICATION

The present application claims priority from Japanese Patent Application No. JP 2008-332134 filed in the Japanese Patent Office on Dec. 26, 2008, the entire content of which is incorporated herein by reference.

BACKGROUND OF THE INVENTION

1. Field of the Invention

The present invention relates to content display control apparatuses, methods therefor, programs therefor, and recording media therefor and, more particularly, to a content display control apparatus, a method therefor, a program therefor, and a recording medium therefor, which enable realization of slideshow displaying of contents, allowing users to watch the contents easily and comfortably with a display duration time suitable for each of the contents.

2. Description of the Related Art

Nowadays, for example, DVD players, which have application software and the like incorporated therein, the application software enabling slideshow displaying of images taken by digital cameras and the like, are widely used. Once such a DVD player is loaded with a DVD having a plurality of images recorded therein and is caused to commence reproduction thereof, the images are sequentially displayed at the intervals of a predetermined period of time on a display.

Further, various kinds of pieces of application software and the like, which allow comments, captions and the like to be superimposed on images in executing processes of slideshow displaying, have been developed.

Moreover, an electric album display system has been proposed, which enables performing of slideshow displaying, in which, without making any modifications to contents contained in a DVD, images each having captions superimposed thereon, which are generated on the basis of information stored in a memory card, can be displayed (refer to Japanese Unexamined Furthermore, for example, a service, in which pieces of data related to images taken by using digital cameras and the like are uploaded from individual personal computers and the like connected to a network, and each group of the uploaded images is published as a Web-site, which is laid out just like an album, has been provided. Such a service is called an online album service. In this online album service, for example, annotations on images taken by friends or description of comments thereon for reference can be performed.

SUMMARY OF THE INVENTION

Meanwhile, with progress of technologies which allow arbitrary comments or captions to be added to images, a large number of comments or captions are likely to be added to each image. Performing slideshow displaying of such images each having a large number of comments added thereto leads to a difficulty in setting a display duration time for each of the images, with which users can watch the images easily and comfortably.

That is, since it takes a relatively large amount of time for users to read a large number of comments (a large number of characters), it is necessary to set a sufficient amount of display duration time for each image in the slideshow displaying.

In contrast, in a Web application such as the online album service, comments are added to images at user's option, and as a result, images each having few comments or no comment added thereto are also displayed in the same manner as that of images having a large number of comments added thereto.

As describe above, since display duration times suitable for individual images, which depend on an amount of number of comments added thereto, are different one another, it is difficult to set display duration times for individual images with which users can watch the images easily and comfortably.

Furthermore, in existing technologies, it is necessary for users to make adjustments by performing certain operations and the like at any time when the users feel it hard to read comments during the slideshow displaying. For example, it is necessary for users to halt a proceeding of slideshow displaying or switch displaying of a currently displayed image to an image to be subsequently displayed, by manipulating a remote controller and the like for a DVD player.

Accordingly, it is desirable to provide a content display control apparatus, a method thereof, a program thereof, and a recording medium therefor, which enable realization of slideshow displaying of contents, allowing users to watch the contents easily and comfortably with a display duration time suitable for each of the contents.

A content display control apparatus according to an embodiment of the present invention includes a content obtaining section configured to obtain a content, a character string obtaining section configured to obtain data associated with a character string which is made to correspond to the obtained content, a line segmentation section configured to segment the character string associated with the obtained data into a line in accordance with a criterion which is determined in advance, a line-by-line display duration time setting section configured to set a display duration time of the character string on a line-by-line basis, and a line-by-line display controller configured to sequentially superimpose and display the segmented line of the character string in accordance with the corresponding display duration time set thereby, wherein the line-by-line display duration time setting section counts the number of characters included in the segmented line of the character string, calculates a period of time corresponding to the counted number of characters, and set the calculated period of time as the display duration time corresponding to the segmented line of the character string, and wherein, subsequent to completion of displaying of the segmented line of the character string which is made to correspond to the obtained content, the line-by-line display controller performs displaying of a different content.

Further, the line-by-line display controller is configured to compare the calculated period of time corresponding to the counted number of characters with a minimum display duration time which is set in advance, and in the case where the calculated period of time corresponding to the counted number of characters is less than the minimum display duration time, set the minimum display duration time as the display duration time of the corresponding line.

Further, the line-by-line display controller is configured to, in the case where a total amount of the display duration time corresponding to the segmented line of the character string which is made to correspond to the content is less than a display duration time of the content, which is set in advance, subsequent to termination of the display duration time of the content which is set in advance, perform displaying of a different content.

Further, the content display control apparatus according to an embodiment of the present invention further includes a line-by-line display duration time reconfiguration section configured to, in the case where a total amount of the display duration time corresponding to the segmented line of the character string which is made to correspond to the content is less than a display duration time of the content, which is set in advance, reconfigure the display duration time of the segmented line on the basis of a ratio of the total amount of the display duration time corresponding to the segmented line relative to the display duration time of the content, which is set in advance.

Further, the content display control apparatus according to an embodiment of the present invention further includes a line-by-line display duration time changing section configured to change the display duration time corresponding to the segmented line, which is set in advance by the line-by-line display duration time setting section.

Further, the line segmentation section is configured to count the number of characters included in the character string associated with the data which is made to correspond to the obtained content, and in the case where the counted number of characters is more than a preset number of characters, segment the character string into a plurality of lines.

Further, the content and the data associated with the character string are configured to be stored in an information processing apparatus which is connected to the content display control apparatus according to an embodiment of the present invention.

A content display control method according to an embodiment of the present invention includes the steps of obtaining a content, obtaining data associated with a character string which is made to correspond to the obtained content, segmenting the character string associated with the obtained data into a line in accordance with a criterion which is determined in advance, setting a display duration time of the character string on a line-by-line basis, and superimposing and displaying the segmented line of the character string sequentially in accordance with the corresponding display duration time set thereby, wherein the number of characters included in the segmented line of the character string is counted, a period of time corresponding to the counted number of characters is calculated, and the calculated period of time is set as the display duration time corresponding to the segmented line of the character string, and wherein, subsequent to completion of displaying of the segmented line of the character string which is made to correspond to the obtained content, a different content is displayed.

A program according to an embodiment of the present invention causes a computer to function as a content display control apparatus including a content obtaining section configured to obtain a content, a character string obtaining section configured to obtain data associated with a character string which is made to correspond to the obtained content, a line segmentation section configured to segment the character string associated with the obtained data into a line in accordance with a criterion which is determined in advance, a line-by-line display duration time setting section configured to set a display duration time of the character string on a line-by-line basis, and a line-by-line display controller configured to sequentially superimpose and display the segmented line of the character string in accordance with the corresponding display duration time set thereby, wherein the line-by-line display duration time setting section counts the number of characters included in the segmented line of the character string, calculates a period of time corresponding to the counted number of characters, and set the calculated period of time as the display duration time corresponding to the segmented line of the character string, and wherein, subsequent to completion of displaying of the segmented line of the character string which is made to correspond to the obtained content, the line-by-line display controller performs displaying of a different content.

A recording medium according to an embodiment of the present invention includes a program recorded therein, which causes a computer to function as a content display control apparatus including a content obtaining section configured to obtain a content, a character string obtaining section configured to obtain data associated with a character string which is made to correspond to the obtained content, a line segmentation section configured to segment the character string associated with the obtained data into a line in accordance with a criterion which is determined in advance, a line-by-line display duration time setting section configured to set a display duration time of the character string on a line-by-line basis, and a line-by-line display controller configured to sequentially superimpose and display the segmented line of the character string in accordance with the corresponding display duration time set thereby, wherein the line-by-line display duration time setting section counts the number of characters included in the segmented line of the character string, calculates a period of time corresponding to the counted number of characters, and set the calculated period of time as the display duration time corresponding to the segmented line of the character string, and wherein, subsequent to completion of displaying of the segmented line of the character string which is made to correspond to the obtained content, the line-by-line display controller performs displaying of a different content.

Further, the recording medium is configured as a disc, and therein, the content and the data associated with the character string are stored together with the program.

According to an embodiment of the present invention, a content is obtained, data associated with a character string, which is made to correspond to the obtained content, is obtained, the character string associated with the obtained data is segmented into a line in accordance with a criterion which is determined in advance, a display duration time of the character string is set on a line-by-line basis, the segmented line of the character string is sequentially superimposed and displayed in accordance with the corresponding display duration time set thereby, the number of characters included in the segmented line of the character string is counted, a period of time corresponding to the counted number of characters is calculated, the calculated period of time is set as the display duration time corresponding to the segmented line of the character string, and subsequent to completion of displaying of the segmented line of the character string which is made to correspond to the obtained content, a different content is displayed.

According to an embodiment of the present invention, it is possible to provide a content display control apparatus, a method thereof, a program thereof, and a recording medium therefor, which enable realization of slideshow displaying of contents, allowing users to watch the contents easily and comfortably with a display duration time suitable for each of the contents.

BRIEF DESCRIPTION OF THE DRAWINGS

FIG. 8 is a diagram illustrating an example of processes of line-by-line display duration time setting, according to an embodiment of the present invention;

FIG. 11 is a diagram illustrating further another example of information associated with setting of a line-by-line display duration time, according to an embodiment of the present invention;

DESCRIPTION OF THE PREFERRED EMBODIMENTS

Hereinafter, embodiments according to the present invention will be described with reference to drawings.

Figure 1:
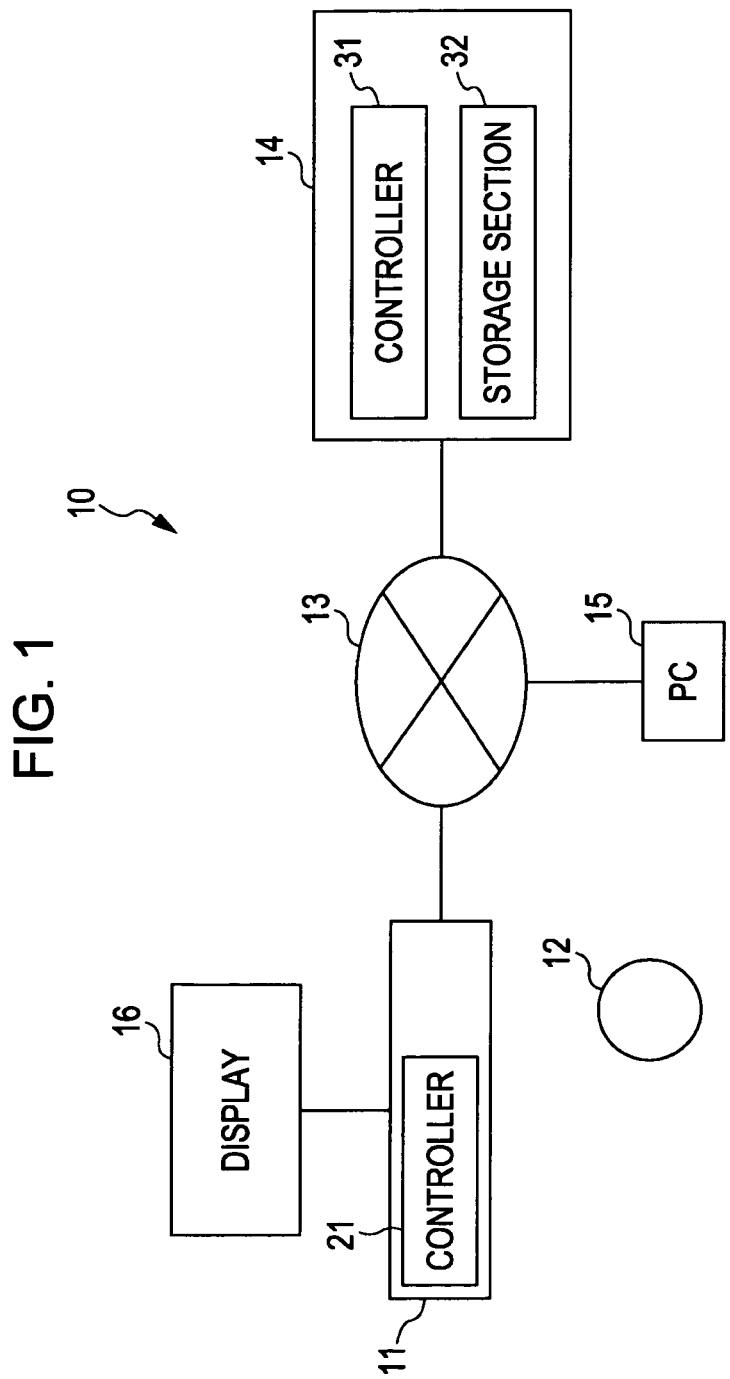
FIG. 1 is a block diagram illustrating an example of a configuration of a network system according to an embodiment of the present invention.

FIG. 1 is a block diagram illustrating an example of a configuration of a network system 10 according to an embodiment of the present invention. The network system 10 is configured to, for example, allow a user using a terminal 11 to access a server 14 via a network 13 such as the Internet, and receive services therefrom, such as an online album service.

Such an online album service is, for example, a service which enables users who are allowed to access the network 13 to create a Web-site just like an album over the network 13 by utilizing functions provided by the server 14. In the online album service, for example, pieces of data related to images taken by using a digital camera are uploaded from a personal computer (PC) 15, which is connected to the network 13, to the server 14, and are stored in the server 14 in groups of images each being a handling unit referred to as an album.

Further, each group of images having been uploaded from the PC 15 can be published as a Web-site laid out just like an album. In such an online album service, the images having been uploaded are configured to be published, for example, to those who have been registered in the server 14 as members of the service in advance.

For example, a user accesses the server 14 from, for example, the PC 15 or the like via the network 13, and performs a procedure to become a member of the online album service. Further, the server 14 notifies the user, who has been allowed to be a member thereof, of a uniform resource locator (URL), and the like, specifying a location of a storage area which is allocated in the server 14 in order to provide users with the online album service. Further, it is also possible for the server 14 to notify the user of a uniform resource locator (URL), and the like, specifying a storage area which is allocated in the server 14 in order to provide the user with a specific album provided by the online album service. Subsequently, on the basis of these URLs, it is possible for the user to download pieces of data related to images contained in the specific album to the PC 15, the terminal 11 or the like, and cause the images to be displayed on a display thereof.

Further, the online album service is also configured to limit those who can see the uploaded images to, for example, only family and friends of the user. In this case, a password or the like which permits access to the uploaded images is set, and on the basis of the foregoing URLs and the password or the like, it is possible to permit obtaining of pieces of data related to images contained in the specific album.

Moreover, the online album service is configured to allow comments to be added to individual images which have been uploaded to the server 14. For example, by allowing those who can access a specific album to write impressions and the like on individual images contained in the specific album and cause the server 14 to store the impressions and the like therein as pieces of text-based data and the like, it is possible to add comments to the specific image. The images provided by the online album service are published together with comments added thereto.

The terminal 11 is configured to access the server to receive an online album service provided thereby, further, obtain pieces of data related to images contained in a desired album, and perform slideshow displaying of the images on a display 16.

The terminal 11 is configured to be loaded with a disc 12, and reproduce data included in the disc 12. The terminal 11 is configured as, for example, a Blu-Ray Disc (BD) player or a BD recorder, and have connection terminals which allow the terminal 11 to be connected to a network 13, such as the Internet.

The terminal 11 is configured to include a drive which is loaded with the disc 12 and reads out data from the disc 12 loaded in the drive. Further, in the case where the disc 12 is a writable medium, the terminal 11 may be configured to write data into the disc 12.

The disc 12 is configured by, for example, a Blu-Ray Disc (trademark). An existing DVD has a recording capacity of approximately 4.7 Gbytes, whilst a Blu-Ray Disc has a very large recording capacity, which is a recording capacity of approximately 25 Gbytes. Further, in the disc 12, prescribed programs are recorded in advance, and the terminal 11 is configured to, upon reproduction of data from the disc 12, cause a controller 21 to execute the programs recorded in the disc 12.

The programs recorded in the disc 12 in advance are written in, for example, programming languages that are independent of types of computers and kinds of operation systems, further, supporting usage over networks, and being executable regardless of manufacturers or types of the terminal 11. This program may be created by, for example, manufacturers of the disc 12, or manufacturers of the terminal 11.

With respect to a Blu-Ray Disc, compared with, for example, an existing DVD, two kinds of functions are enhanced, one being a representation function of representing contents recorded in the disc to users, the other one being a navigation function of indicating an operation to be performed subsequent to receipt of an input from an user. This navigation function is realized by causing the controller 21 to execute programs recorded in the Blu-Ray Disc (the Disc 12), and more specifically, various navigation functions are realized by causing the controller 21 to execute a group of application programs which is referred to as BD-J, being written in the programming language Java (trademark).

The controller 21 included in the terminal 11 is configured to include a processor, memory, and the like, and perform control of individual sections included in the terminal 11. The controller 21 is also configured to perform control of processing for communication made between the terminal 11 and the server 14 via the network 13. As described below, the controller 21 is configured to be capable of executing pieces of software, such as programs read out from the disc 12.

The server 14 is configured by using a general-purpose computer capable of connecting to the network 13. The server 14 includes a controller 31 having, for example, a processor, memory and the like therein, a storage section 32 configured to include a hard disc drive (HDD) and the like. In the storage section 32, programs executed by the controller 31, and the like, are stored, and causing the controller 31 to execute prescribed programs enables the server 14 to realize provision of the online album service. Further, pieces of data related to images which have been uploaded and are used as contents in the online album service are stored in the storage section 32.

In addition, in an example shown in FIG. 1, the network 13 is configured to be connected to one PC 15 and one terminal 11, however, in actual cases, the network 13 is connected to more PCs and more terminals.

Figure 2:
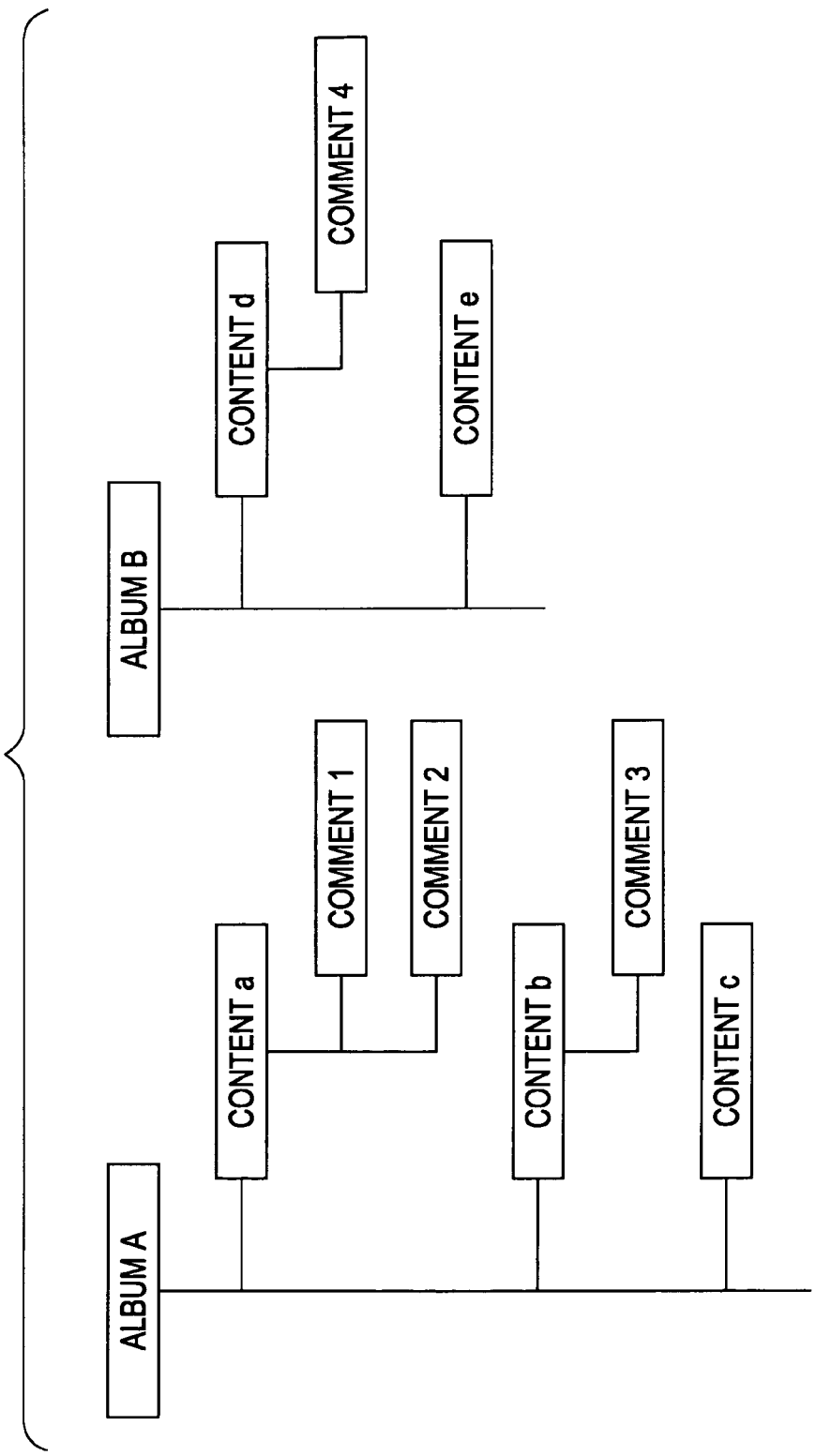
FIG. 2 is a diagram illustrating an example of a configuration of pieces of data stored in a storage section included in a server shown in FIG. 1.

FIG. 2 is a diagram illustrating an example of a configuration of pieces of data stored in the storage section 32 included in the server 14. In the example shown in FIG. 2, the pieces of data stored in the storage section 32 are configured to have a structure of directories.

In the example shown in FIG. 2, directories such as an album A, an album B, . . . are created. The directories such as the album A, the album B, . . . are created by, for example, a user of the PC 15 or the like, who is allowed to receive the provision of the online album service, prior to uploading of pieces of data related to images. For example, the album A is created as an album for images taken during a wedding ceremony, and the album B is created as an album for images taken during a family trip.

For example, a user of the PC 15 performs uploading of pieces of data corresponding to images taken during a wedding ceremony, a wedding reception, a honeymoon and the like as images to be included in the album A. Here, each piece of data corresponding to an image, or the like, handled in the online album service is referred to as a content. In this example, a content a, a content b and a content c are made to correspond to a directory "Album A". Further, a content d and a content e are made to correspond to a directory "Album B". The content a to the content e are each configured to be a directory corresponding to, for example, a piece of still image data, and specify a storage location (a memory address or the like) of the corresponding piece of still image data.

That is, in the case where the terminal 11 receives the provision of the online album service, the terminal 11 accesses a desired directory (for example, the directory "Album A") in the storage section 32 of the server 14. Further, individual pieces of image data which are stored so as to correspond to the desired directory (for example, respective pieces of data related to images corresponding to the content a to the content c) are read out, and the read-out pieces of data are obtained by the terminal 11, that is, are downloaded to the terminal 11.

In addition, users can also perform addition or deletion of certain pieces of data related to images from among pieces of data related to images, which are stored so as to correspond to individual albums.

Further, the directories of the content a to the content e are configured to include comments corresponding thereto. In this example, a comment 1 and a comment 2 are assigned to correspond to the directory of the content a. The comment 1 and the comment 2 are each configured to be a directory corresponding to a piece of comment data, and specify a storage location of the corresponding piece of comment data.

For example, a piece of comment data, which is stored so as to correspond to the comment 1, is a piece of text-based data corresponding to a character string described as follows: "Congratulations On Your Wedding!". Further, a piece of comment data, which is stored so as to correspond to the comment 2, is a piece of text-based data corresponding to a character string described as follows: "The price is very high, but the ceremonial hall is broad and beautiful, and French dishes and Japanese dishes are gorgeous and taste good!"

In such a manner, it is possible to configure an image so as to include a desired number of comments added thereto. In addition, as a matter of course, it is also possible to configure an image so as to include no comment added thereto. In the example shown in FIG. 2, comments are also added to the content b and the content d, respectively, in the same manner as that of the case of the content a.

Figure 3:
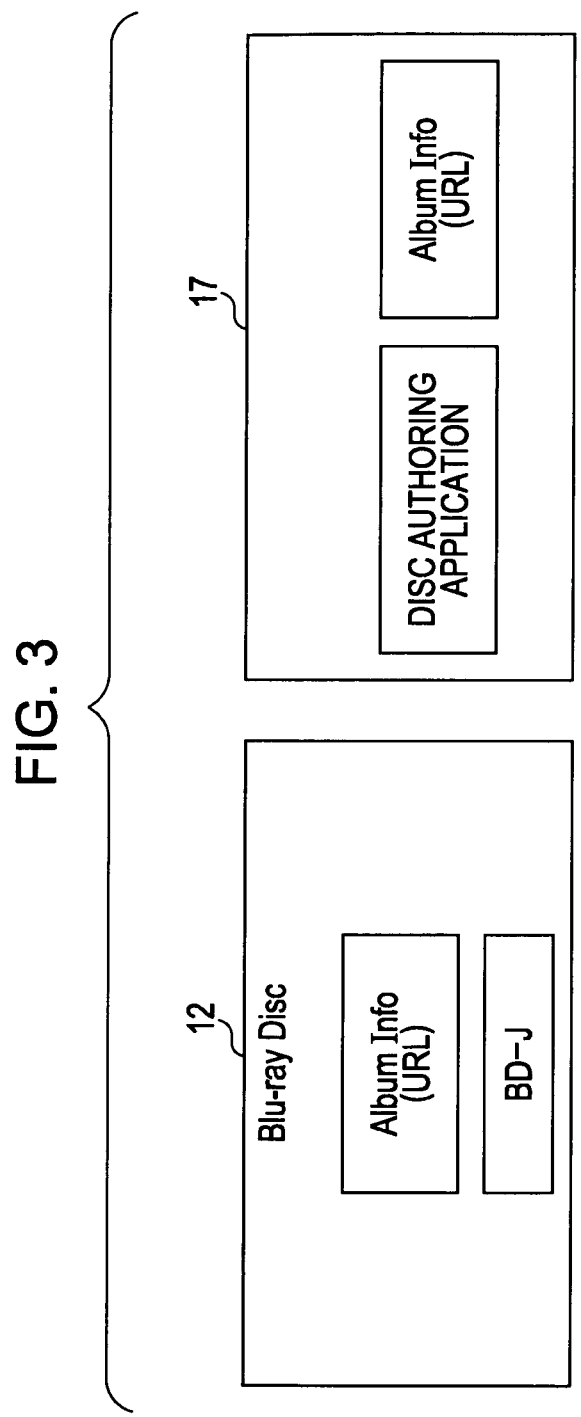
FIG. 3 is a diagram illustrating an example of data recorded in a disc according to an embodiment of the present invention.

FIG. 3 is a diagram illustrating an example of data recorded in the disc 12. In this example shown in FIG. 3, data is recorded onto the disc by a disc data recording apparatus 17. In addition, the disc data recording apparatus may be configured by using a general-purpose personal computer which includes a drive therein, capable of being loaded with the disc 12.

The disc data recording apparatus 17 includes a disc authoring application program installed therein. Further, in the disc data recording apparatus 17, a block of data "Album Info" is stored in advance. The block of data "Album Info" is used for accessing a specific album stored in the server 14, and includes, for example, a URL, an ID and a password, which specify the album stored in the server 14, and the like. Moreover, in the disc data recording apparatus 17, bytecodes of the foregoing group of application programs, which are referred to as BD-J, are stored in advance.

Once the disc data recording apparatus 17 is loaded with the disc 12 and the disc authoring application program is executed, the block of data "Album Info" and the bytecodes of BD-J are recorded into the disc 12.

Once the terminal 11 is loaded with the disc 12, and performs reproduction of data recorded in the disc 12, the block of data "Album Info" and the bytecodes of BD-J are read out from the disc 12, and are loaded into the memory of the controller 21. Further, by causing the controller 21 to execute the group of application programs BD-J, the terminal accesses a specified album stored in the server 14, further, performs downloading of pieces of data related to images and the corresponding comments from the server 14, and then, retains the downloaded pieces of data related to images and the corresponding comments in the memory of the controller 21. Moreover, on the basis of the obtained pieces of data related to images, the controller 21 displays the images on the display 16, and concurrently therewith, the controller 21 superimposes the comments, which are character strings obtained on the basis of pieces of data related to comments, onto the images displayed on the display 16.

Figure 4:
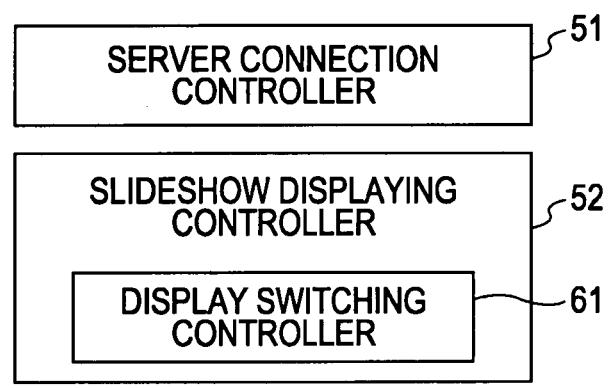
FIG. 4 is a block diagram illustrating an example of a functional configuration of BD-J, which is software executed by a controller and is recorded in a disc, according to an embodiment of the present invention.

FIG. 4 is a block diagram illustrating an example of a functional configuration of BD-J recorded in the disc 12. A server connection controller 51 shown in FIG. 4 is configured to obtain the block of data "Album Info", and perform control of an access to the server 14 via the network 13. On the basis of pieces of data related images and comments having been downloaded from the server 14, a slideshow displaying controller 52 is configured to perform control of processes of performing slideshow displaying of images and the corresponding comments. Moreover, a display switching controller 61 is configured to perform control of switching displays of images and comments during slideshow displaying executed in accordance with control performed by the slideshow displaying controller 52.

Next, processes of slideshow displaying performed by the terminal 11 will be described with reference to a flowchart shown in FIG. 5.

In step S21, the terminal 11 reproduces data from the disc 12 which is loaded into a drive included in the terminal 11 itself. Through this process, the blocks of data "Album Info" and bytecodes of BD-J are read out, and these blocks of data are written into the memory of the controller 12. Further, the group of application programs BD-J are executed by the controller 21.

In step S22, the server connection controller 51 obtains the block of data "Album Info". Through this process, a uniform resource locator (URL), which specifies a specific album, an ID, a password and the like, which are used for performing a login to the server 14, are obtained.

In step S23, the server connection controller 51 accesses the server 14 on the basis of information having been obtained in step S22. Through this process, the specified album can be accessed. For example, the processes performed in step 23 cause an access to the directory "Album A", having been described with reference to FIG. 2, to be completed, and subsequently, enable the server connection controller 51 to obtain any of the pieces of data related to the content a to the content c and the comment 1 to the comment 3.

In step S24, the slideshow displaying controller 52 obtains one content out of those corresponding to the album having been accessed in step S23. Further, in step S25, the slideshow displaying controller 52 obtains comments corresponding to the content having been obtained in step S24.

Through this process, for example, a piece of data related to an image corresponding to the content a shown in FIG. 2 and pieces of data related to the comment 1 and the comment 2 corresponding to the content a are obtained. In addition, for example, in the case where a piece of data related to an image corresponding to the content c is obtained in step S24, since there is no comment corresponding to the content c, no operation of obtaining any comments is invoked in step S25.

In step S26, the display switching controller 61 performs control processes of switching displays, which will be described below with reference to FIG. 6. Through this process, control of switching displays of images and comments during the slideshow displaying are performed.

Here, a detailed example of control processes of switching displays will be described with reference to a flowchart shown in FIG. 6.

In step S41, the display switching controller 61 determines whether any comments have been obtained in step S25, or not, and in the case where it is determined that any comments have been obtained in step S25, the flow of processing proceeds to step S42.

In step S42, the display switching controller 61 counts the number of characters of comments having been obtained in step S25.

Here, it is assumed that, in step S24, pieces of data related to an image corresponding to the content a have been obtained, and in step S25, pieces of data related to the comment 1 and the comment 2 have been obtained. Further, the comment 1 is a character string including characters described as follows: "Congratulations On Your Wedding!", and the comment 2 is a character string including characters described as follows: "The price is very high, but the ceremonial hall is broad and beautiful, and French dishes and Japanese dishes are gorgeous and taste good!".

In step S42, the number of characters is counted for each comment. Firstly, the number of characters included in the comment 1 is counted. In this case, the counted number of characters included in the comment 1 is 32 including spaces. Further, the counted number of characters included in the comment 2 is 138 including spaces.

In step S43, the display switching controller 61 determines whether comments are to be segmented, or not. In the case where comments are superimposed and displayed on an image, characters included in the comments are displayed on a line-by-line basis, and displaying of characters included in each line of comments is sequentially switched. That is, characters included in a certain line of comments are displayed below an image being displayed on the display 16, and subsequently, characters included in a subsequent line of the comments are displayed . . . and, in this manner, displaying of comments is sequentially switched on a line-by-line basis. This is because, usually, in the slideshow displaying, a prime objective is displaying of images, and therefore, it is difficult to have a large space for displaying comments. Further, it is assumed that a maximum number of characters included in one line of comments is determined in advance so as to provide a character font size and a space size between neighboring characters which enable users to easily read the characters.

Here, it is assumed that the maximum number of characters included in one line is set to 80. Since the number of characters included in the comment 1 is 32, which includes the number of spaces, it is possible to display the characters included in the comment 1 in one line, and as a result, in step S43, it is determined that it is unnecessary to segment the characters included in the comment 1. In contrast, since the number of characters included in the comment 2 is 138, which includes the number of spaces, it is difficult to display the characters included in the comment 2 in one line, and as a result, in step S43, it is determined that it is necessary to segment the characters included in the comment 2.

In addition, handling may be performed so that characters included in comments are superimposed and displayed on an image by a group of two lines, three lines, . . . , but, here, an example, in which characters included in comments are superimposed and displayed on an image on a line-by-line basis, will be described below.

In step S43, in the case where it is determined that it is necessary to segment the characters included in comments, the flow of processing proceeds to step S44, where the comments are segmented into a plurality of lines. In contrast, in step S43, in the case where it is determined that it is unnecessary to segment the characters included in comments, the flow of processing skips processes to be performed in step S44.

In the current case, the characters included in the comment 2 are segmented into two lines. As a result of this segmentation, for example, displayed characters included in a segmented first line of the comment 2 are as follows: "The price is very high, but the ceremonial hall is broad and beautiful, and Fren", the number of characters included therein being 80, which includes the number of spaces, and displayed characters included in a segmented second line of the comment 2 are as follows: "ch dishes and Japanese dishes are gorgeous and taste good!", the number of characters included therein being 58, which includes the number of spaces. Alternatively, handling may be performed so that, in order to allow users to easily read the comment, the characters are segmented on the basis of punctuation marks, and as a result, characters displayed in a segmented first line are as follows: "The price is very high, but the ceremonial hall is broad and beautiful,", the number of characters included therein is 71, which includes the number of spaces, and characters displayed in a segmented second line are as follows: "and French dishes and Japanese dishes are gorgeous and taste good!", the number of characters included therein is 67, which includes the number of spaces.

That is, in the case where it is determined that the number of characters included in comments is more than a maximum number of characters allowed to be displayed within one line (which is 80 in the current case), the characters included in the comments are segmented into characters to be displayed in a first line and characters included in a second line, and further, it is determined whether the number of characters included in the second line is more than the maximum number of characters allowed to be displayed within one line, or not. Further, in the case where it is determined that the number of characters included in the second line is more than the maximum number of characters allowed to be displayed within one line, the characters included in the second line are further segmented into characters to be displayed in the second line and characters to be displayed in a third line. In such a manner, the characters included in comments are segmented into groups of characters, each being displayed as one line of a plurality of lines, so that the number of characters included in each group is less than or equal to the maximum number of characters allowed to be displayed within one line (which is 80 in the current case).

In addition, hereinbefore, as the first example, a segmentation method, in which a string of characters included in comments is segmented simply on the basis of a maximum number of characters allowed to be displayed within one line, has been described, and further, as the second example, another segmentation method, in which a string of characters included in comments is segmented on the basis of punctuation marks, has been described, however, other methods may be used as the segmentation method.

For example, handling may be performed so that, in the case where the number of words included in a certain line of a character string is more than a preset number of words, the words included in the certain line are segmented into those of the certain line and those of a subsequent line. In this case, handling may be performed so that a morphological analysis is performed on a character string in order to break down the character string into individual words, and in the case where the number of words included in a certain line is more than a maximum number of words allowed to be displayed within one line, the words included in the certain line are segmented into those of the certain line and those of a subsequent line. Alternatively, a part of a character string, which can be separated from the character string by using a preset prescribed set of signs or marks, may be separated and moved into a subsequent line. For example, a part of a character string, which is enclosed within a set of parentheses, may be separated and moved to a subsequent line.

In addition, hereinbefore, an example in which comments are described in English has been described, however, in the case where the comments are described in languages other than English, a character string of comments may be segmented into a plurality of groups of characters by using methods other than those described above.

In the case of the foregoing example, as a result of processes performed in steps S42 to S44, the characters included in the comment 1 are not segmented, but the characters included in the comment 2 are segmented into two lines of characters.

In step S45, the display switching controller 61 executes processing for comment display duration time setting, which will described below with reference to FIG. 7. As a result of this processing, a line-by-line display duration time, which is a display duration time for each line of individual comments, is set. For example, setting of a display duration time for each line of individual comments is such that, X seconds for a first line of the comment 1, Y seconds for a second line of the comment 1, Z seconds for a first line of the comment 2, . . .

In step S46, the display switching controller 61 performs displaying of a content. Through this process, an image content is displayed on the display 16.

In step S47, the display switching controller 61 superimposes and displays characters included in one line of comments on the image content having been displayed on the display 16 in step S46. In addition, as described above, in the case where the comments include a plurality of lines, the comments are displayed on a line-by-line basis, and displaying of the comments is sequentially switched by each line of the comments.

In step S48, the display switching controller 61 determines whether a display duration time of a certain line of the comments, which started to be displayed in step S47, has passed, or not. As described above, setting of a display duration time for each line of individual comments has been completed through processes in step S45. In step S48, for example, a duration time from commencement of displaying a certain line of the comments performed in step S47 up to the present time is counted by using a timer or the like, and is compared with a duration time of the certain line of the comment, setting of which has been completed in step S45.

Further, the display switching controller 61 waits until it is determined that the display duration time of the certain line of the comment has passed. That is, until it is determined that the display duration time for the certain line of the comment has passed, displaying of characters included in the certain line of the comment, which was commenced in step S47, has been continued, and the characters included in the certain line of the comment have been also superimposed and displayed on the image content, which has been continued to be displayed since the displaying thereof was commenced through processes performed in step S46.

In step S48, in the case where it is determined that the display duration time of the certain line of the comment, the displaying of which was commenced in step S47, has passed, the displaying of the certain line of the comment, which was commenced during processes performed in step S47, is terminated, that is, the display of the certain line of the comment is erased from the screen of the display 16, and then, the flow of processing proceeds to step S49.

In addition, erasing of display characters included in a certain line of the comment may be performed at one time for all the characters included in the certain line, or, for example, the characters included in a certain line of a character string of the comment may be sequentially erased from a leftmost character thereof. Alternatively, handling may be performed so that the characters included in a certain line of a character string of the comment are scroll displayed on a character-by-character basis in a direction from the right-hand side to the left-hand side of a screen, and in conjunction therewith, each of the characters, which is located at the leftmost position thereof resulting from the scroll operation, is sequentially erased at the same timing as that of a subsequent scroll operation.

In step S49, the display switching controller 61 determines whether there is a subsequent line of the comment, or not. That is, in step S49, it is determined that there is a subsequent line of the comment, provided that characters in a first line of the comment started to be displayed on the display 16 in step S47, the characters included in the comment having being segmented into a plurality of lines of characters through processes performed in step 44, and further, characters included in the last line of the comment have not yet been displayed. Further, in step S49, it is determined that there is a subsequent line of the comment, provided that a plurality of comments are added to the content which started to be displayed through processes performed in step S46, and further, the last comment has not yet been displayed. In other words, in step S49, it is determined whether all the lines of characters to be superimposed and displayed on the image content, which started to be displayed through processes performed in step S46, have been completely displayed, or not.

In step S49, in the case where it is determined that there is a subsequent line, the flow of processing returns to step S47, and processes to be performed in steps S47 to S49 are executed again.

In step S49, in the case where it is determined that there is no subsequent line, the flow of processing proceeds to step S50. In addition, processing may be performed so that, subsequent to displaying of the last line of the comment, the flow of processing is made to proceed to step S41, where it is determined whether a new comment is added to the comment, or not, and in the case where a new comment is added to the comment, the new comment is obtained, and then, processes in step S41 to step S49 are executed. A reason why such an optional process is provided here is that, in the online album service, a plurality of users can add comments at any time.

Additionally, in step S41, in the case where it is determined that no comment is obtained, the processes in steps S42 to S49 are skipped.

During Step S50, the display switching controller determines whether a default (initially set) content display duration time has passed, or not.

In the slideshow, for example, a display duration time of each content is set in advance. For example, in the case where the content is a still image, the display duration time of each image is set to a certain value in advance, such as "ten seconds for each image", and once the display duration time has passed, the present display is switched to a subsequent display. A display duration time of each content, which is set in advance in such a manner, is referred to as a default content duration time.

In addition, this default display duration time may be incorporated into application programs and the like, which are executed to realize functions of the slideshow displaying, or may be set to a prescribed duration time on the basis of a user's operation.

In step S50, for example, a duration time from a timing where display of an image content was commenced in step S46 until the present time, which has been counted by a timer or the like, is compared with a default content display duration time. Further, in step S50, the display switching controller 61 waits until it is determined that the default content display duration time has passed.

That is, the displaying of the image content, which was commenced in step S46, is continued until, in step S50, it is determined that the default content display duration time has passed.

In contrast, in step S50, once it is determined that the default content display duration time has passed, the displaying of the image content, which was commenced in step S46, is terminated, that is, the image content is erased from the screen of the display 16.

That is, in the case where the total amount of the line-by-line comment display duration times is less than the default content display duration time, the displaying of the image content is continued even after the displaying of the comments is stopped. In contrast, in the case where the total amount of the line-by-line comment display duration time is more than or equal to the default content display duration time, the display is switched to a subsequent image content immediately after the displaying of all the comments corresponding to the image content has been stopped.

Figure 5:
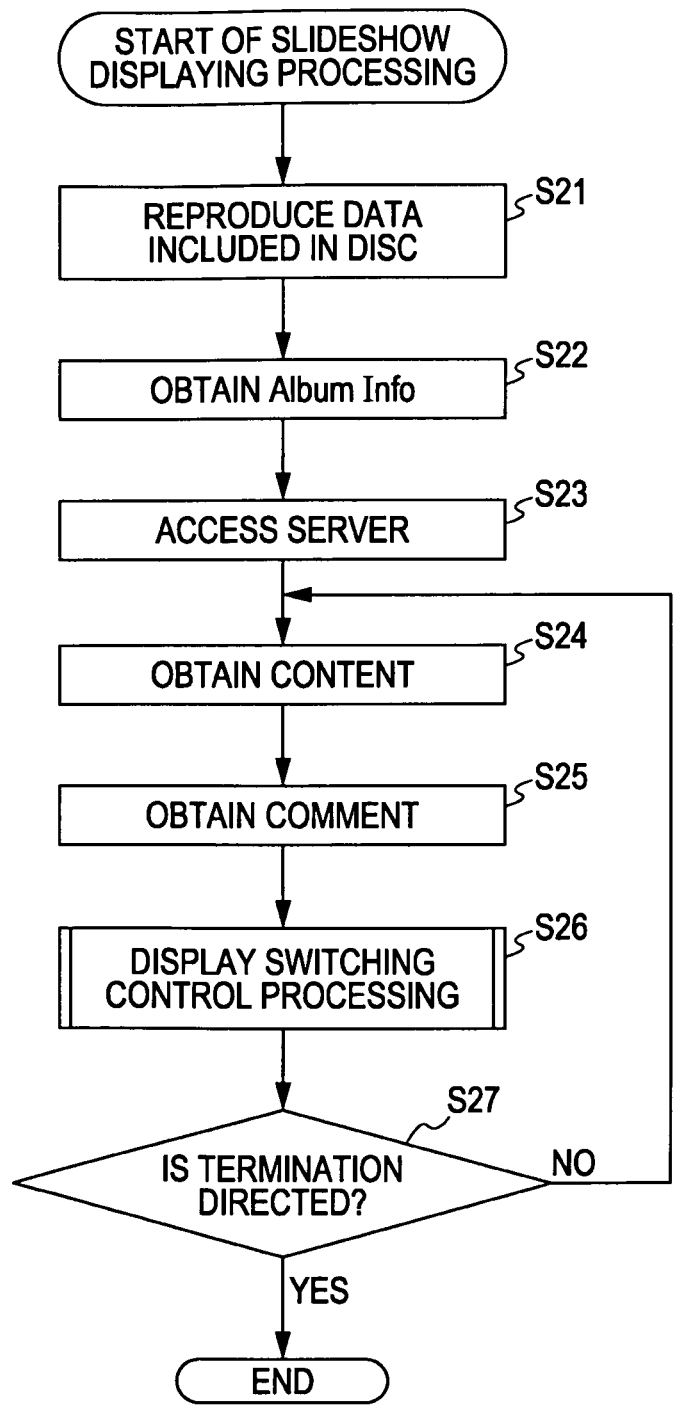
FIG. 5 is a flowchart illustrating an example of processes of slideshow displaying, according to an embodiment of the present invention.

In step S50, in the case where it is determined that the default content display duration time has passed, the control process of switching display is terminated, and the flow of processing proceeds to step S27 shown in FIG. 5.

In step S27, shown in FIG. 5, the display switching controller 61 determines whether the termination of the slideshow displaying is indicated, or not. In the case where it is determined that the termination of the slideshow displaying is not indicated, the flow of processing returns to step S24, where a content subsequent to the presently targeted album is obtained. In the current case, through processes performed in steps S24 and S25, for example, a piece of data related to an image corresponding to the content b and a piece of data related to a comment 3 corresponding to the content b, which are shown in FIG. 2, are obtained.

In such a manner as described above, by iterating the processes in steps S24 to S27, content images and comments added thereto of the currently targeted album are sequentially displayed.

For example, in the case where the termination of the slideshow displaying is indicated by operations of a remote controller performed by users, which is omitted from illustration in FIG. 1, in step S27, it is determined that the termination of the slideshow displaying is indicated, and then, the flow of processing is terminated.

In such a manner as described above, the processes of the slideshow displaying is executed. In addition, as described above, in the process of executing processes of the slideshow displaying, pieces of data related to contents and comments are obtained, and thus, for example, even in the case where, in the process of executing processes of the slideshow displaying, any contents or comments are newly added, it is possible to appropriately perform the slideshow displaying.

Further, in the case where processes of the slideshow displaying, with respect to an album the same as a currently targeted album, were performed in the past, processing may be performed so that pieces of data related to comments having already been obtained (i.e., having been read) through the processes of the slideshow displaying performed in the past are not obtained. In addition, it is possible to determine whether the currently targeted comment has already been read, or not, by following a method as described below.

The method is such that, for example, upon termination of the slideshow displaying, a piece of information, specifying an album for which the slideshow displaying has been completed, and regarding a current day and time, are stored as a piece of previous display information. Further, afterward, when performing slideshow displaying of an album the same as the album for which slideshow displaying has been previously performed, the piece of information regarding a day and time stored in the previous display information is compared with a day and time when a piece of data related to the currently targeted comment was created, and thereby, it is possible to determine that the currently targeted comment is a previously read comment, provided that the currently targeted comment was created before the day and time represented by the stored piece of previous display information.

Next, an example of processes of comment display duration time setting, performed in step S45 shown in FIG. 6, will be described in detail.

Here, description will be made on the assumption that pieces of data related to images corresponding to the content a are obtained in step S24, and pieces of data related to the comment 1 and the comment 2 are obtained in step S25. Further, it is assumed that the comment 1 is a character string described as follows: "Congratulations On Your Wedding!", and the comment 2 is a character string described as follows: "The price is very high, but the ceremonial hall is broad and beautiful, and French dishes and Japanese dishes are gorgeous and taste good!"

Furthermore, as a result of processes performed in steps S42 to S44, the comment 1, which is not segmented, is a comment including one line of characters, and the comment 2 is segmented into two lines of characters. Here, it is assumed that the comment 2 is segmented into two lines on the basis of punctuation marks, the first line of characters being "The price is very high, but the ceremonial hall is broad and beautiful,", the number of characters included therein being 71, which includes the number of spaces, the second line of characters being "and French dishes and Japanese dishes are gorgeous and taste good!", the number of characters included therein being 67, which includes the number of spaces.

In step S61, the display switching controller 61 counts the number of characters included in a certain line. As described above, the comment 1 includes only one line of characters, and the counted number of characters is 32.

In step S62, the display switching controller 61 calculates a display duration time corresponding to the number of characters included in the certain line, the number of characters having been counted in step S61, and sets the calculated display duration time as a display duration time for the certain line of characters. For example, assuming that the display duration time is 1 second for each group of characters, in this case, it is necessary to set the display duration time for the comment 1, which includes only one line of 32 characters, to (32/20)*1 second=1.6 seconds.

In addition, the foregoing display duration time regarding characters: 1 second for each group of 20 characters, is determined with reference to a method employed in the case where subtitles using English language are superimposed on screens of movies in which a language other than English language is spoken, however, the display duration time regarding characters may be appropriately set in accordance with design specifications of a targeted apparatus, setting by users, or the like.

In step S63, the display switching controller 61 determines whether the line-by-line display duration time, which was set in step S62, is less than a minimum display duration time per one line of comments, or not. For example, in the case where a large number of comments each including a small number of characters are added to an image content, the method, in which displaying of comments is switched on the basis of a display duration time corresponding to the number of characters, is likely to make users watching the display 16 to feel uncomfortable. For this reason, the minimum display duration time per one line of comments is set in advance, and in the current case, it is assumed that the minimum display duration time per one line of comments is, for example, 3 seconds.

In step S63, in the case where it is determined that the display duration time for a certain line of characters, which was set in step S62, is less than the minimum display duration time per one line of comments, the flow of processing proceeds to step S64, where the minimum display duration time per one line of comments is set as a display duration time of the certain line.

In the current case, the display duration time of the first line of the comment 1 is 1.6 seconds, which was set in step S62, and this value is less than the minimum display duration time per one line of comments, and thus, in step S64, the display duration time of the first line of the comment 1 is set to 3.0 seconds. That is, in the case where a display duration time of a certain line, which corresponds to the number of characters included in the certain line, is less than the minimum display duration time per one line of comments, the display duration time of the certain line is set again to the minimum display duration time per one line of comments.

Figure 6:
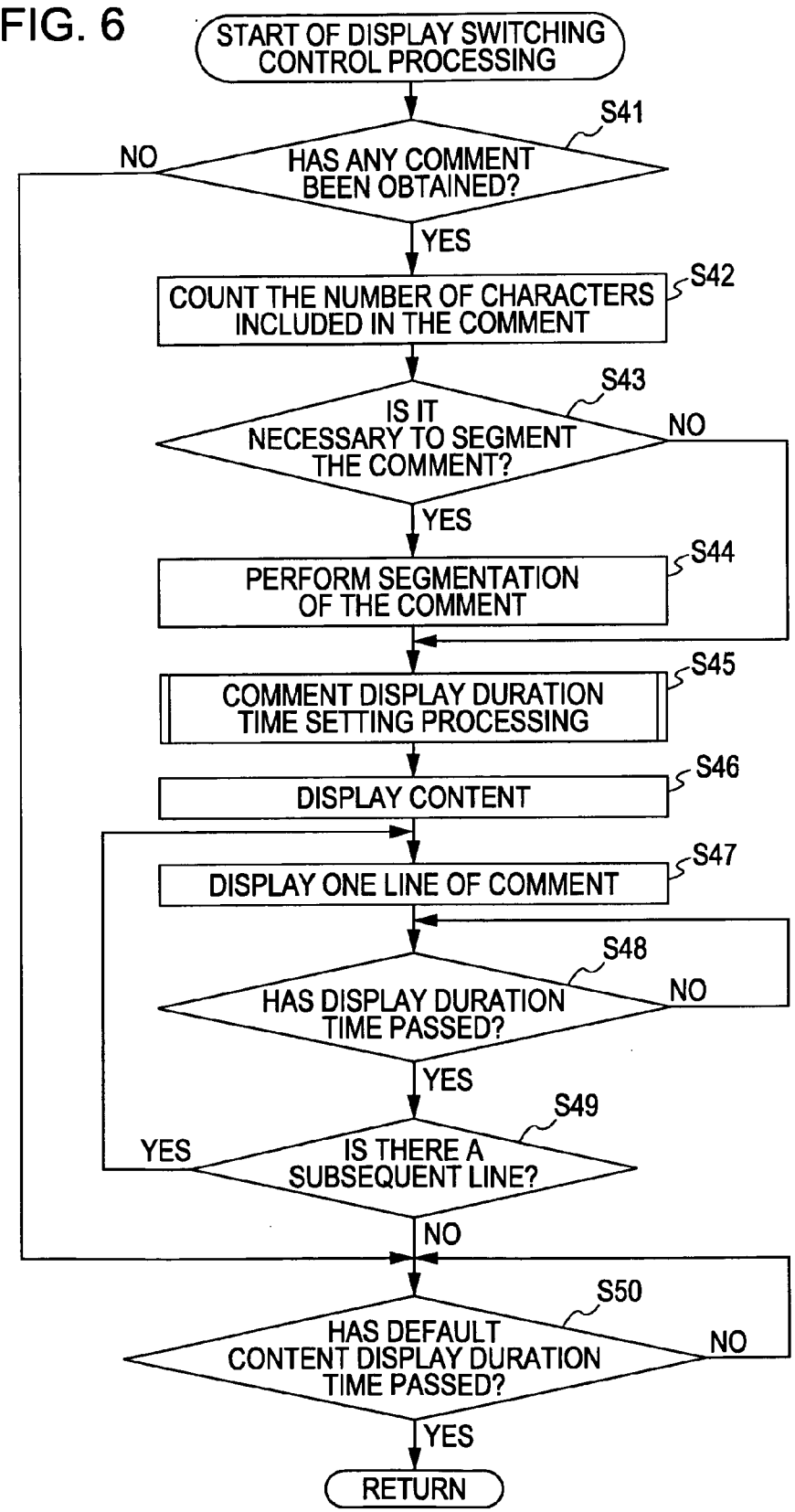
FIG. 6 is a flowchart illustrating an example of processes of display switching, according to an embodiment of the present invention.

In step S65, the display switching controller 61 determines whether there is a subsequent line, or not, by making a determination regarding whether the line-by-line display duration times for all lines of characters included in comments to be superimposed and displayed on an image content, which started to be displayed through processes performed in step S46 shown in FIG. 6, have been completely set, or not. In the current case, setting of the line-by-line display duration time of the first line and the second line of the comment 2 has not yet been completed, and therefore, in step S65, it is determined that there is a subsequent line, and the flow of processing returns to step S61.

Further, in step S61, the number of characters included in the first line of the comment 2 is counted. As described above, the counted number of characters included in the first line of the comment 2 is 71.

In step S62, the display switching controller 61 calculates a display duration time corresponding to the number of characters included in a certain line, which was counted in step S61, and sets the calculated display duration time as a line-by-line display duration time of the certain line. In the current case, the number of characters included in the currently targeted line is 71, and thus, the display duration time of the currently targeted line is as follows: (71/20)*1 second=3.6 seconds.

In step S63, the display switching controller 61 determines whether the line-by-line display duration time, which was set in step S62, is less than the minimum display duration time per one line of comments, or not. In the current case, the line-by-line display duration time, which was set in step S62, is 3.6 seconds (>3.0) seconds, and therefore, in step S63, it is determined that the line-by-line display duration time of the currently targeted line is not less than the minimum display duration time per one line of comments, further, the flow of processing skips processes to be performed in step S64, and proceeds to step S65. Subsequently, the flow of processing returns to step S61 again, where a line-by-line display duration of the second line of the comment 2 is set.

In such a manner, a line-by-line display duration time is set for each line of comments.

Figure 7:
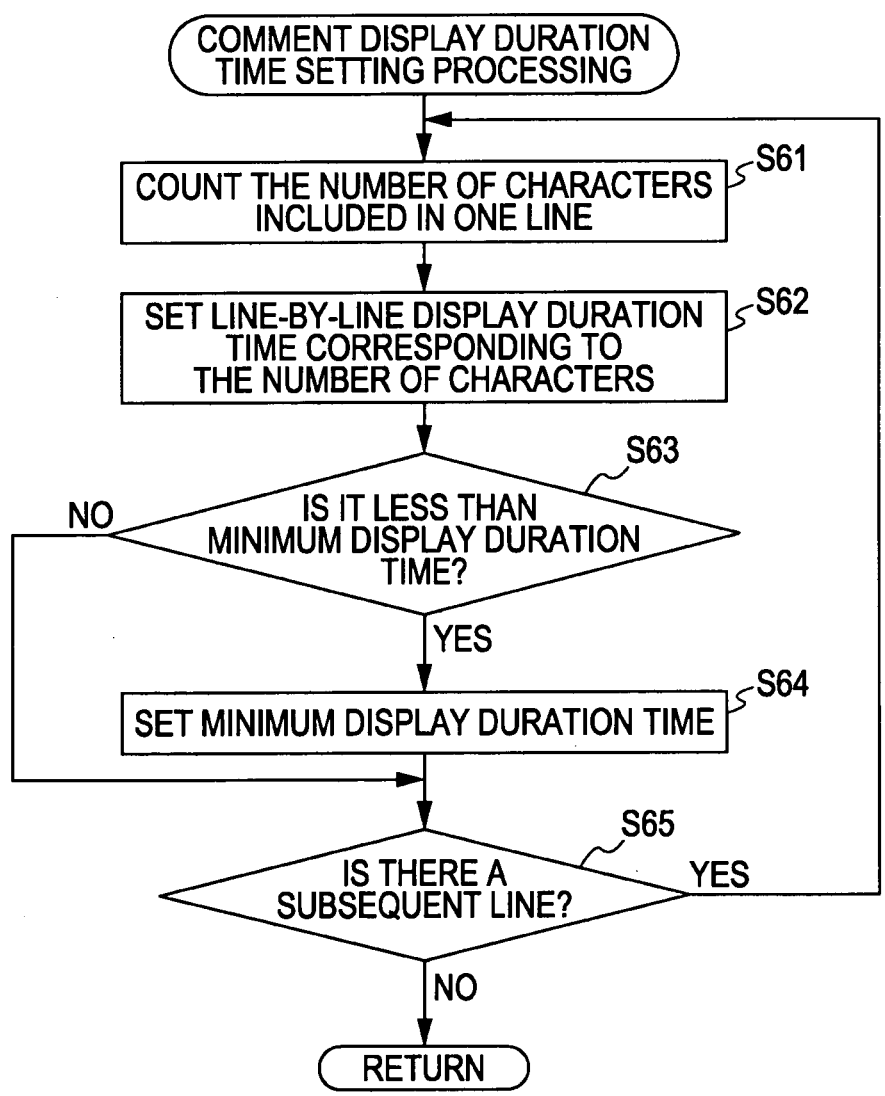
FIG. 7 is a flowchart illustrating an example of processes of comment display duration time setting, according to an embodiment of the present invention.

FIG. 8 is a diagram illustrating an example of a line-by-line display duration time for each line, which is set through processes shown in FIG. 7. As shown in FIG. 8, the comment 1 includes only one line of characters, the number of which is 32. Further, a line-by-line display duration time thereof, which was calculated and set through processes performed in step S62, and will be hereinafter referred to as a calculated duration time, is 1.6 seconds, and is less than the minimum display duration time per one line of comments, i.e., 3.0 seconds. As a result, the line-by-line display duration time of the first line of the comment 1 is set to 3.0 seconds.

Further, the comment 2 includes two lines, and the number of characters included in the first line of the two lines is 71. Further, a calculated duration time for the first line of comment 2 is 3.6 seconds, and is more than the minimum display duration time per one line of comments, i.e., 3.0 seconds. As a result, the line-by-line display duration time of the first line of the comment 2 is set to 3.6 seconds. Moreover, the number of characters included in the second line of the comment 2 is 67. Further, a calculated duration time of the second line of comment 2 is 3.4 seconds, and is more than the minimum display duration time per one line of comments, i.e., 3.0 seconds. As a result, the line-by-line display duration time of the second line of the comment 2 is set to 3.4 seconds.

In addition, hereinbefore, an example, in which line-by-line display duration times of comments are automatically set, was described, however, for example, handling may be performed so that line-by-line display duration times, which are automatically set once, can be appropriately changed by users.

For example, in the case where slideshow displaying processes are performed on the basis of automatically set line-by-line display duration times, when users feel it hard to read displayed comments, users may change the line-by-line display duration times by performing prescribed operations. For example, each of the line-by-line display duration times shown in FIG. 8 is multiplied by a value N. In the case where the value N is 1.5, as a result, the line-by-line display duration times of the first line of the comment 1, the first line of the comment 2 and the second line of the comment 2 are 4.5 seconds, 5.4 seconds and 5.1 seconds, respectively. By providing such a method, it is possible to perform the slideshow displaying so as to provide users who desire to read comments carefully with a period of time sufficient for users to read the comments.

Pieces of information related to setting of the line-by-line display duration times, shown in FIG. 8, are, for example, retained in the memory and the like included in the controller 21. On the basis of individual line-by-line display duration times having been set in such a manner as described above, processes in steps S47 to S50, shown in FIG. 6, are executed.

That is, in the case of the example shown in FIG. 8, once 3.0 seconds have passed since the displaying of the first line of the comment 1 was commenced, the display is switched to the first line of the comment 2. Further, once 3.6 seconds have passed since the displaying of the first line of the comment 2 was commenced, the display is switched to the second line of the comment 2. Subsequently, once 3.4 seconds have passed, since the displaying of the second line of the comment 2 was commenced, in step S50, a duration time from the timing when the image content a started to be displayed in step S46 until the present time is compared with the default content display duration time.

In the current case, 10.0 seconds (=3.0+3.6+3.4) have passed since the image content a started to be displayed, and have come to the default content display duration time, i.e., 10 seconds. Therefore, upon completion of displaying of the second line of the comment 2, the displaying of the image content a is switched to that of the image content b.

In such a manner as described above, a line-by-line display duration time of each line of comments is set. In addition, as described above, erasing of display characters included in a certain line of the comment may be performed at one time for all the characters included in the certain line, or, for example, the characters included in a certain line of a character string of the comment may be sequentially erased from a leftmost character thereof. Alternatively, handling may be performed so that the characters included in a certain line of a character string of the comment are scroll displayed on a character-by-character basis in a direction from the right-hand side to the left-hand side of a screen, and in conjunction therewith, each of the characters, which is located at the leftmost position thereof resulting from the scroll operation, is sequentially erased at the same timing as that of a subsequent scroll operation. In the case where the sequentially erasing is performed, the line-by-line display duration time is defined as a period of time from a timing when a first character of a certain line appears on a display until a timing when a last character of the certain line is erased from the display.

In the case where comments each including a large number of characters or a large number of comments are added to one image content, in existing methods for slideshow displaying, it is difficult to set the line-by-line display duration time which enables users to easily read the comments.

That is, it takes a large amount of time for users to read a large number of comments, and therefore, it is necessary to set a sufficient display duration time for each image in the slideshow displaying. However, the comments are arbitrary added to each image, thus, causing a disadvantage in that images each having few comments or no comment added thereto are displayed in the same manner as that of images each having a large number of comments added thereto. As described above, an optimal display duration time for each image depends on an amount of number of comments added thereto, and thus, is different from one another.

In existing technologies, when performing slideshow displaying, for example, it has been necessary for users to operate a remote controller to halt processes of the slideshow displaying, or switch displaying from a present image to a subsequent image.

In contrast, in this embodiment according to the present invention, a display duration time for each line of comments is automatically set so as to make it easy to read characters included in the line. Further, displaying of characters included in a certain line of comments is switched to displaying of characters included in a subsequent line thereof in accordance with the set display duration time corresponding to the certain line. Further, in conjunction with the display duration time of each line of comments, a timing of switching display of an image content corresponding to the comments is controlled. Therefore, it is possible to perform slideshow displaying of contents, which provides users with an optimal display duration time for each content, thus, enabling the users to watch the contents easily and comfortably.

Hereinbefore, an example, in which such pieces of information as those shown in FIG. 8 are created while performing the processes of the slideshow displaying, was provided, however, for example, such pieces of information as those shown in FIG. 8 may be created in advance. That is, by performing obtaining of pieces of data related to contents and comments in advance, and the like, a line-by-line display duration time for each line of individual comments are set and stored in advance, and afterward, on the basis of the stored line-by-line display duration times, the slideshow displaying may be performed.

Meanwhile, in the foregoing processes performed in step S50 shown in FIG. 6, image contents are each continued to be displayed until the default content display duration time of the content has passed. Therefore, even after displaying of all comments added to the image content has been completed, the image content is likely to be continued to be displayed until the default content display duration time has passed. For example, in the case where the number of characters included in each line of a comment is sufficient small, the display of the comment is switched one after another, whilst the display of the image content is continued even after displaying of all the lines of the comment has been completed, and thus, such a way of displaying is likely to make users watching the slideshow displaying to feel uncomfortable.

Therefore, in the case where a small number of characters are included in each of lines of comments added to an image content, a line-by-line display duration time of each line of the comments may be set in accordance with a display duration time of the image content.

Figure 9:
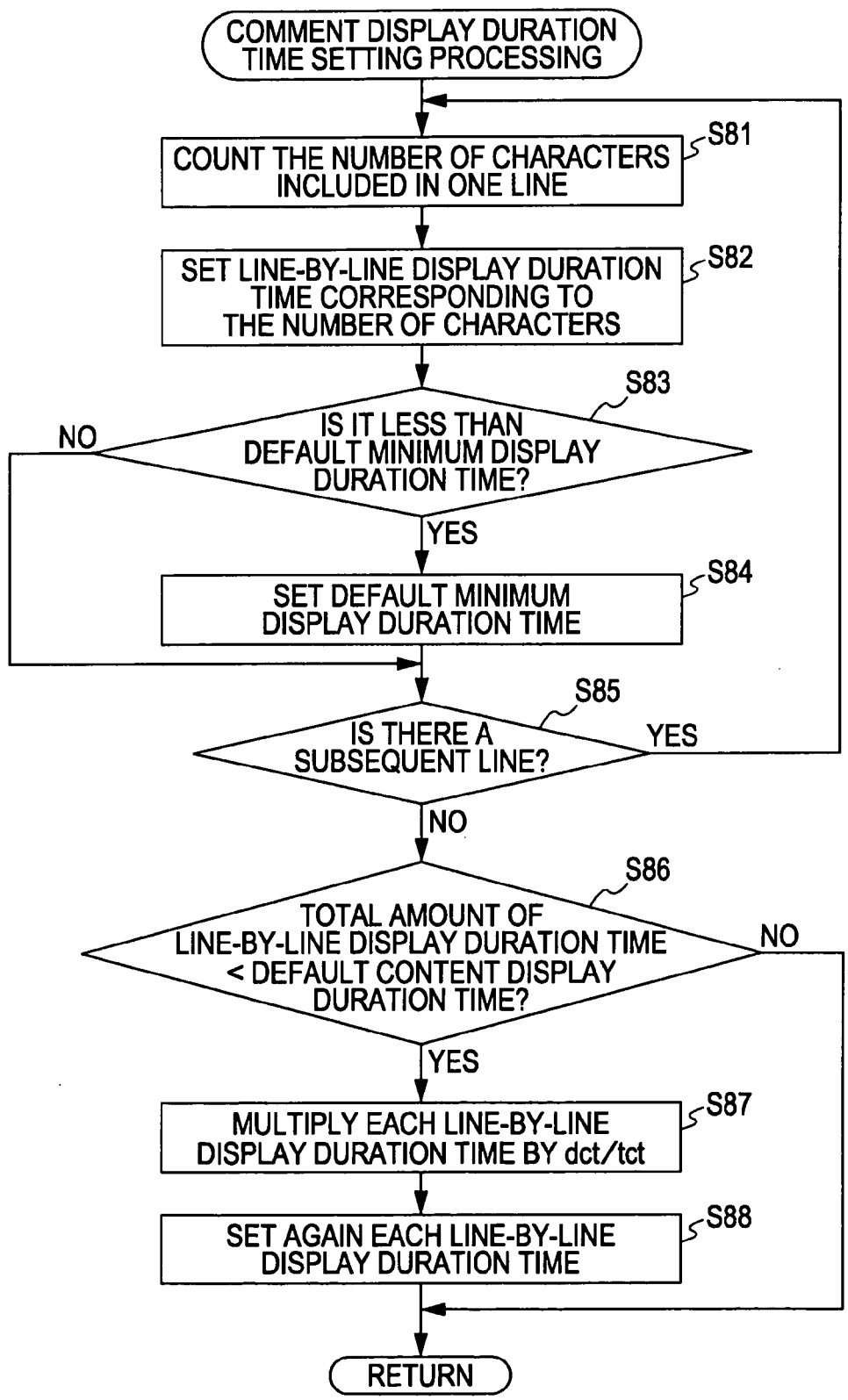
FIG. 9 is a flowchart illustrating another example of processes of comment display duration time setting, according to an embodiment of the present invention.

FIG. 9 is a flowchart illustrating another detailed example of processes of comment display duration time setting, performed in step S45 shown in FIG. 6. In case of the example shown in FIG. 9, differing from the foregoing case having been described with reference to the flowchart shown in FIG. 7, the number of characters included in each line of comments added to an image content is so small that a line-by-line display duration time for each line is reconfigured in accordance with a display duration time of the image content.

Here, the following description will be made on the assumption that, in step S24, pieces of data related to an image corresponding to the content a is obtained, and in step S25, pieces of data related to the comment 1 and the comment 2 are obtained. Further, in the current case, it is assumed that, through processes performed in steps S42 and S43, the comment 1 and the comment 2 are not segmented, and include one line of characters, respectively. Further, the following description will be made on the assumption that the number of characters included in a first line of the comment 1 is 10, and the number of characters included in a first line of the comment 2 is 15.

Processes performed in steps S81 to S85 are the same as those in steps S61 to S65, and thus, are omitted from detailed description.

Figure 10:
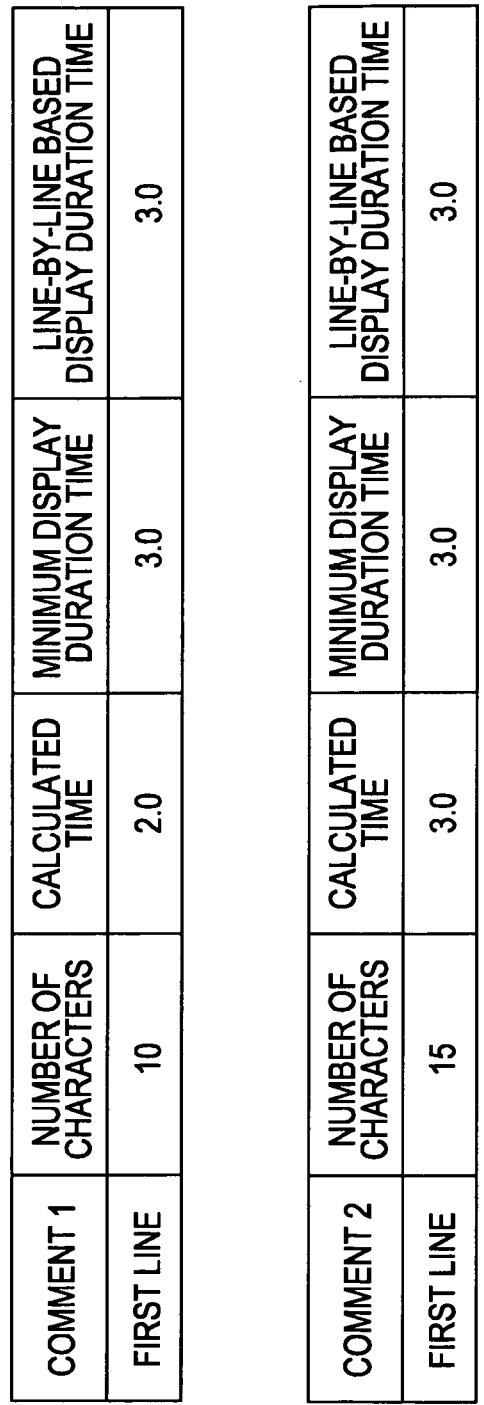
FIG. 10 is a diagram illustrating another example of information associated with setting of a line-by-line display duration time, according to an embodiment of the present invention.

In the current case, as a result of performing processes in steps S81 to S85, as shown in FIG. 10, line-by-line display duration times for respective lines of the comment 1 and the comment 2 are set, respectively. In the example shown in FIG. 10, the comment 1 includes one line, the number of characters included in the line being 10. Further, a calculated time is 2.0 seconds, and is less than a minimum display duration time per one line of comments, i.e., 3.0 seconds. As a result, the line-by-line display duration time of the first line of the comment 1 is set to 3.0 seconds. The comment 2 also includes one line, the number of characters included in the line being 15. Further, a calculated time is 3.0 seconds, and is not less than (is equal to) the minimum display duration time per one line of comments, i.e., 3.0 seconds, and as a result, the line-by-line display duration time of the first line of the comment 2 is set to 3.0 seconds.

In step S85, in the case where it is determined that there is no subsequent line, the flow of processing proceeds to step S86.

In step S86, the display switching controller 61 determines whether the total amount of line-by-line display duration times is less than the default content display duration time, or not.

In the current case, comments added to the image content includes 2 lines resulting from totaling of the first line of the comment 1 and the first line of the comment 2. The display switch controller 61 sets the sum of the line-by-line display duration times of the foregoing two lines, for example, into a variable tct. In the current case, the variable tct is set to 6.0 seconds (=3.0+3.0). Furthermore, the display switching controller 61 sets a default content display duration time into, for example, a variable dct. In the current case, assuming that the default content display duration time is 10 seconds, the variable dct is set to 10 seconds.

In case of this example, in step S86, it is determined that the sum of line-by-line display duration times (tct) is less than the default content display duration time (dct), and the flow of processing proceeds to step S87.

In step S87, the display switching controller 61 performs multiplication of line-by-line display duration times of respective lines of comments, which are set through processes in steps S81 to S85, by a value resulting from division of dct by tct. That is, a line-by-line display duration time of the first line of the comment 1 (3.0 seconds) and a line-by-line display duration time of the first line of the comment 2 (3.0 seconds), which are shown in FIG. 10, are multiplied by a value resulting from division of 10 by 6, respectively.

In step S88, on the basis of the obtained values through processes in step S87, the display switching controller 61 performs reconfiguration of line-by-line display duration times of respective lines. In such a manner, pieces of information related to setting of line-by-line display duration times, which was described above with reference to FIG. 10, are updated to those shown in FIG. 11.

In an example shown in FIG. 11, the line-by-line display duration time of the first line of the comment 1 and the line-by-line display duration time of the first line of the comment 2 are 5.0=(3*10/6) seconds, respectively.

In addition, in step S86, in the case where it is determined that the sum of the line-by-line display duration times (tct) is not less than the default content display duration time (dct), the processes to be performed in steps S87 and S88 are skipped. That is, in the case where it is determined that the sum of the line-by-line display duration times (tct) is not less than the default content display duration time (dct), the reconfiguration of the line-by-line display duration times to be performed in step S88 is not performed.

In such a manner, setting of comment display duration times is performed. By employing such a method as described above, for example, in the case where each line of comments includes a small number of characters, it is possible to set line-by-line display duration times of respective lines of comments added to an image content in accordance with a display duration time of the image content.

For example, even in the case where the number of characters included in respective lines of comments is sufficient small, the method of setting line-by-line display duration times performed in such a manner enables suppression of occurrence of a condition in which displaying of the comments is switched one after another, whilst displaying of the image content remains continued even after displaying of all the lines of the comments has been completed. Therefore, it is possible to switch displaying of contents at appropriate timings which allow users watching the slideshow displaying to easily read the comments without feeling uncomfortable.

Hereinbefore, an example, in which images each including comments superimposed thereon, has been described, however, besides the comments, the foregoing embodiment according to the present invention can be applied to cases in which pieces of character-based information other than the comments are displayed concurrently with displaying of contents. For example, the forgoing embodiment of the present invention can be applied to methods for display of telop information, display of movie subtitles, display of content titles and the like.

Further, hereinbefore, an example, in which the contents are still images, has been described, however, the contents may be moving images. In the case where the contents are moving images, when comments added thereto include a large number of characters, for example, handling may be performed so that, subsequent to completion of reproduction of the present content, the reproduction is temporarily stopped, further, all the comments are displayed, and then, the processing is switched to the reproduction of a subsequent content.

Further, hereinbefore, an example, in which the slideshow displaying of images provided by the online album service is performed, has been described, however, obviously, the foregoing embodiment according to the present invention can be applied to cases in which the slideshow displaying of contents recorded in the disc 12 or a recording medium used for a HDD included in the terminal 11, or the like, is performed. That is, the foregoing embodiment according to the present invention can be applied to apparatuses having no function of being connected to the network 13.

For example, an example, in which pieces of "Album Info" and byte-codes of BD-J are recorded in the disc 12, was described with reference to FIG. 3, however, pieces of data related to images (contents) and pieces of data related to comments included in albums may be also recorded in the disc 12. Further, pieces of data recorded in the disc 12 are not limited to these pieces of data, but pieces of data related to music and contents related to movies may be recorded in the disc 12.

Further, hereinbefore, an example, in which the processes of performing slideshow displaying, shown in FIG. 5, are invoked immediately after the controller 12 executes a group of application programs of BD-J recorded in the disc 12, was described, however, the foregoing embodiment according to the present invention is not limited to the example. For example, obviously, handling may be performed so that the processes of performing slideshow displaying, shown in FIG. 5, are invoked immediately after the controller 21 executes a group of application programs recorded in a recording medium other than the disc 12.

Next, a production method of the disc 12, which is a recording medium in which pieces of data reproduceable in the terminal 11 are recorded, will be described with reference to FIGS. 12 and 13.

Figure 12:
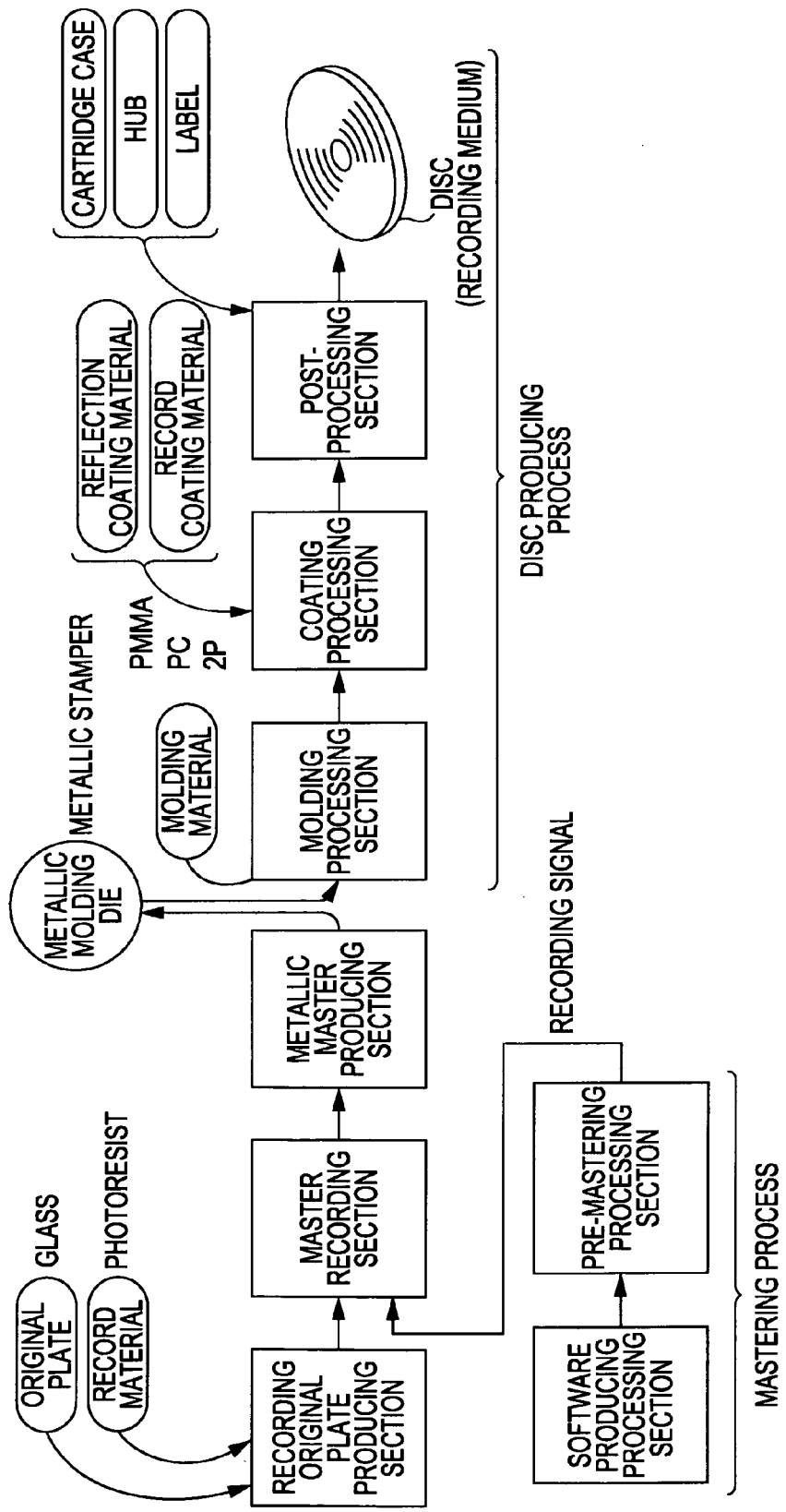
FIG. 12 is a diagram illustrating a production of a recording medium including data recorded therein, which is reproduceable in a terminal.
Figure 13:
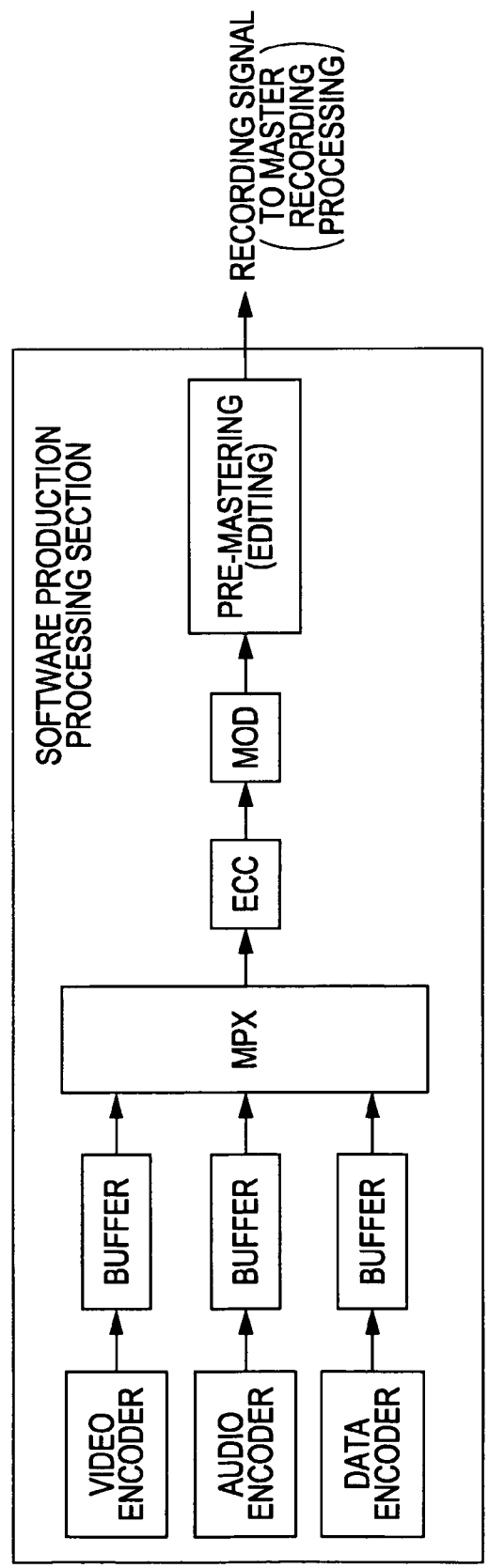
FIG. 13 is a diagram illustrating a production of a recording medium including data recorded therein, which is reproduceable in a terminal.

That is, as shown in FIG. 12, for example, an original plate made of glass is provided, and thereon, coating of a record material made of, for example, photoresist is performed. In this manner, a recording original plate is produced.

Further, in a software producing processing section, pieces of software, which are reproduceable in the terminal 11 and are recorded in a recording medium, are produced. For example, in the case where pieces of data related to contents, such as movies, are created and recorded, the software producing processing section is configured as shown in FIG. 13.

In the software producing processing section, shown in FIG. 3, pieces of video data, which is encoded by an encoding device (a video encoder) and is of a format capable of being reproduced by the terminal 11, are stored in a first temporary buffer. Further, pieces of audio data encoded by an audio encoder are stored in a second temporary buffer, and further, pieces of data other than streams of data (for example, Indexes, Playlist, PlayItem and the like), which are encoded by a data encoder, are stored in a third temporary buffer.

The pieces of video data, the pieces of audio data, the pieces of data other than streams of data, and further, a synchronization signal are multiplexed by a multiplexer (MPX), and an error correction code is added to the multiplexed signal by an error correction code circuit (ECC). Further, the resultant pieces of data are appropriately modulated by a modulation circuit (MOD), further, the modulated signal being temporarily recorded into, for example, a magnetic tape in a prescribed format, and thereby, pieces of software recorded in a recording medium of a format capable of being reproduced by the terminal 11 are produced.

Subsequently, editing (pre-mastering) of these pieces of software is performed in accordance with necessity, and a recording signal of a format adapted to being recorded in an optical disc is created. Further, as shown in FIG. 12, a laser beam is modulated in accordance with this recording signal, and this modulated laser beam is radiated onto photoresist coated on a master. In such a manner, the photoresist on the master is exposed in accordance with the recording signal.

Subsequently, by developing this master, pits are produced on the master. By performing processes of electrotyping and the like regarding the master having been subjected to such processes as described above, a metallic master, to which the pits having been produced on the glass master are transcribed, is produced. From this metallic master, further, a metallic stumper is produced, and this is used as a metallic molding die.

Further, a material, such as acrylic resign (PMMA) or polycarbonate (PC), is injected into the metallic molding die by performing injection molding, and is caused to be immobilized. Alternatively, after coating ultraviolet curing resign (2P) or the like on the metallic stumper, the material, such as acrylic resign (PMMA) or polycarbonate (PC), is irradiated with ultraviolet, and as a result, is caused to be hardened. This method enables transcription of the pits having been produced on the metallic stumper onto a replica made of a resin.

On the replica, which has been produced in such a way, a reflection coating is formed by means of vacuum evaporation or sputtering. Alternatively, on the produced replica, the reflection coating is formed by the spin coating method.

Subsequently, an inner diameter/outer diameter process is performed regarding the disc, and other necessary processes, such as bonding of two discs, are performed. Further, labels are bonded to the disc, a hub being attached thereto, and then, the disc is inserted into a cartridge. In this manner, producing of a recording medium including pieces of data recorded therein, which can be reproduced by the terminal 11, is accomplished.

In addition, a series of processes described above can be executed by using hardware, or by using software. In the case where a series of processes described above is executed by using software, programs constituting the software are installed into computers incorporated in dedicated hardware components, or, for example, a general-purpose personal computer 700 shown in FIG. 14, which is capable of executing various kinds of functions by executing the corresponding various kinds of programs installed thereinto via a network or recording media.

Figure 14:
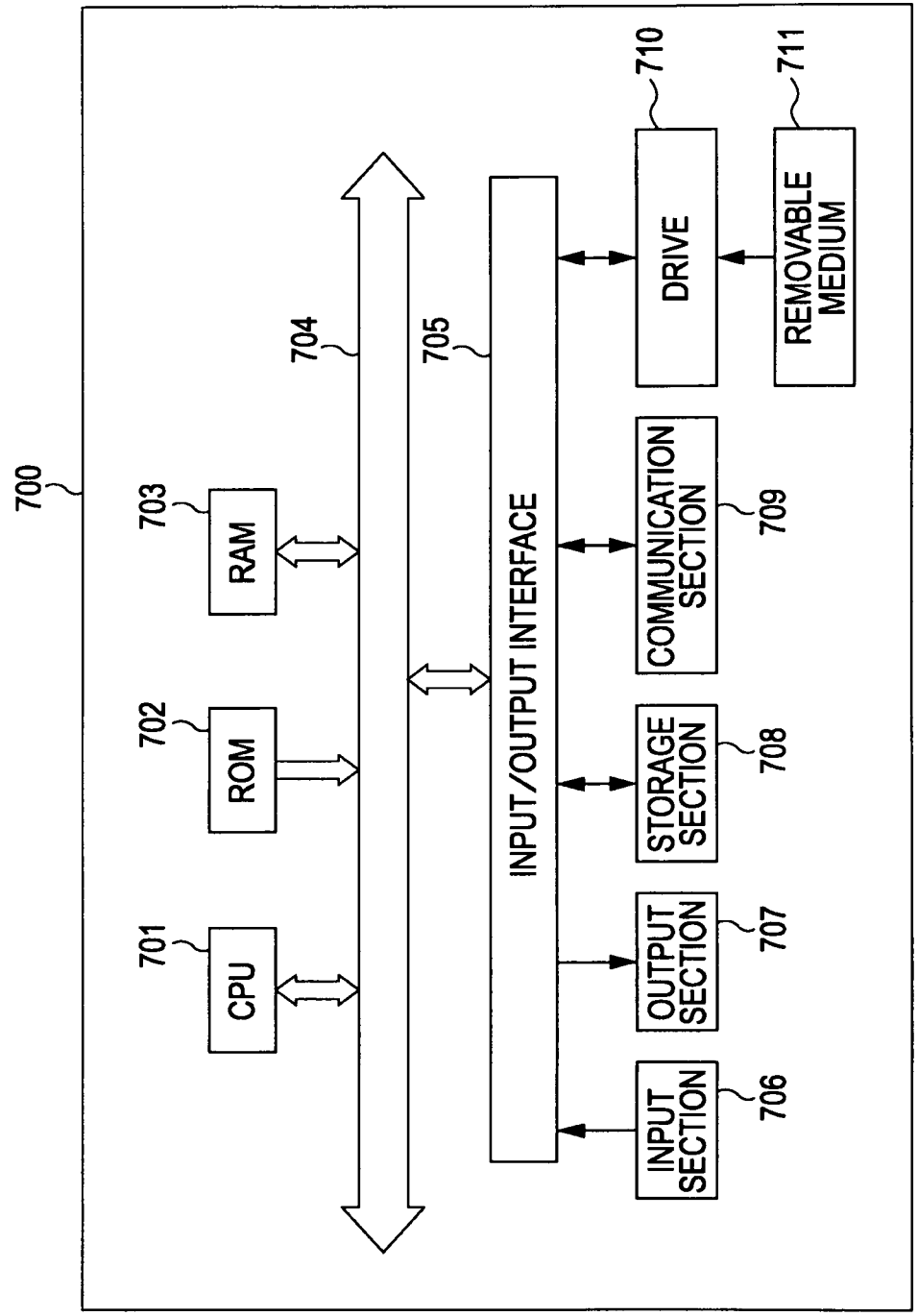
FIG. 14 is a diagram illustrating an example of a configuration of a personal computer.

In FIG. 14, a central processing unit (CPU) 701 executes various kinds of processes in accordance with programs stored in a read only memory (ROM) 702, or programs loaded into a random access memory (RAM) 703 from a storage section 708. Pieces of data and the like used for various kinds of processes performed by the CPU 701 are appropriately stored in the RAM 703.

The CPU 701, the ROM 702 and the RAM 703 are connected one another via a bus 704. An input/output interface 705 is also connected to the bus 704.

Further, an input section 706 configured to include a keyboard and a mouse, a display configured to include a liquid crystal display (LCD) and the like, an output section 707 configured to include a speaker and the like, a storage section 708 configured to include a hard disc and the like, and a communication section 709 configured to include a network interface card, such as a modem, a LAN card and the like, are connected to the input/output interface 705. The communication section 709 performs communication processes via networks including the Internet.

The input/output interface 705 includes a drive 710 connected thereto in accordance with necessity, which is appropriately loaded with a removal medium 711, such as a magnetic disc, an optical disc, a magnet-optical disc, or a semiconductor memory device, and computer programs read out from the removal medium 11 are installed into the storage section 708 when necessary.

In the case where a series of processes described above are executed by using software, programs constituting software are installed via a network, such as the Internet, or a recording medium, such as the removal medium 711.

In addition, this recording medium includes not only the removal medium 711 shown in FIG. 14, which has programs recorded therein, further, is distributed to users apart from the apparatus itself in order to provide the users with the programs, and is configured to have a magnetic disc including a floppy disc (trademark), an optical disc including a compact disc-read only memory (CD-ROM), a digital versatile disc (DVD), and a magnet-optical disk including a Mini-Disk (MD) (trademark), or use a semiconductor memory device, but also the ROM 702, a hard disc incorporated in the storage section 708, and the like, which have the programs recorded therein, and are distributed to users in the condition of being incorporated in the apparatus itself.

In addition, the foregoing series of processes in this patent specification include processes performed time-sequentially in order of described steps, further, processes which may or may not be time-sequentially performed, and processes performed in parallel or independently from one another.

Further, it should be understood by those skilled in the art that embodiments according to the present invention are not limited to the foregoing embodiments, but various modifications or changes can be made within the scope departing from the gist of the present invention.

What is claimed is:

1. A content display control apparatus, comprising:
    content obtaining means configured to obtain a content;
    character string obtaining means configured to obtain data associated with a character string which is made to correspond to the obtained content;
    line segmentation means configured to segment the character string associated with the obtained data into a line in accordance with a criterion which is determined in advance;
    line-by-line display duration time setting means configured to set a display duration time of the character string on a line-by-line basis; and
    line-by-line display control means configured to sequentially superimpose and display the segmented line of the character string in accordance with the corresponding display duration time set thereby;
    wherein the line-by-line display duration time setting means counts the number of characters included in the segmented line of the character string, calculates a period of time corresponding to the counted number of characters, and sets the calculated period of time as the display duration time corresponding to the segmented line of the character string, the period of time being calculated using a ratio of the counted number of characters included in the segmented line of the character string to a number of characters to be displayed for one second; and
    wherein, subsequent to completion of displaying of the segmented line of the character string which is made to correspond to the obtained content, the line-by-line display control means performs displaying of a different content.

2. The content display control apparatus according to claim 1, wherein the line-by-line display control means compares the calculated period of time corresponding to the counted number of characters with a minimum display duration time which is set in advance, and in the case where the calculated period of time corresponding to the counted number of characters is less than the minimum display duration time, the line-by-line display control means sets the minimum display duration time as the display duration time of the corresponding line.

3. The content display control apparatus according to claim 1, wherein, in the case where a total amount of the display duration time corresponding to the segmented line of the character string which is made to correspond to the content is less than a display duration time of the content, which is set in advance, subsequent to termination of the display duration time of the content which is set in advance, the line-by-line display control means performs displaying of a different content.

4. The content display control apparatus according to claim 1, further comprising:
    line-by-line display duration time reconfiguration means configured to, in the case where a total amount of the display duration time corresponding to the segmented line of the character string which is made to correspond to the content is less than a display duration time of the content, which is set in advance, reconfigure the display duration time of the segmented line on the basis of a ratio of the total amount of the display duration time corresponding to the segmented line relative to the display duration time of the content, which is set in advance.

5. The content display control apparatus according to claim 1, further comprising:
    line-by-line display duration time changing means configured to change the display duration time corresponding to the segmented line, which is set in advance by the line-by-line display duration time setting means.

6. The content display control apparatus according to claim 1, wherein the line segmentation means counts the number of characters included in the character string associated with the data which is made to correspond to the obtained content, and in the case where the counted number of characters is more than a preset number of characters, the line segmentation means segments the character string into a plurality of lines.

7. The content display control apparatus according to claim 1, wherein the content and the data associated with the character string are stored in an information processing apparatus which is connected to the content display control apparatus.

8. A content display control method, comprising the steps of:
    obtaining a content;
    obtaining data associated with a character string which is made to correspond to the obtained content;
    segmenting the character string associated with the obtained data into a line in accordance with a criterion which is determined in advance;
    setting a display duration time of the character string on a line-by-line basis; and superimposing and displaying the segmented line of the character string sequentially in accordance with the corresponding display duration time set thereby;

wherein the number of characters included in the segmented line of the character string is counted, a period of time corresponding to the counted number of characters is calculated, and the calculated period of time is set as the display duration time corresponding to the segmented line of the character string, the period of time being calculated using a ratio of the counted number of characters included in the segmented line of the character string to a number of characters to be displayed for one second; and wherein, subsequent to completion of displaying of the segmented line of the character string which is made to correspond to the obtained content, a different content is displayed.

9. A non-transitory recording medium including a program recorded therein, which, when executed by a processor, causes a computer to function as a content display control apparatus, comprising:

content obtaining means configured to obtain a content;

character string obtaining means configured to obtain data associated with a character string which is made to correspond to the obtained content;

line segmentation means configured to segment the character string associated with the obtained data into a line in accordance with a criterion which is determined in advance;

line-by-line display duration time setting means configured to set a display duration time of the character string on a line-by-line basis; and line-by-line display control means configured to sequentially superimpose and display the segmented line of the character string in accordance with the corresponding display duration time set thereby;

wherein the line-by-line display duration time setting means counts the number of characters included in the segmented line of the character string, calculates a period of time corresponding to the counted number of characters, and sets the calculated period of time as the display duration time corresponding to the segmented line of the character string, the period of time being calculated using a ratio of the counted number of characters included in the segmented line of the character string to a number of characters to be displayed for one second; and wherein, subsequent to completion of displaying of the segmented line of the character string which is made to correspond to the obtained content, the line-by-line display control means performs displaying of a different content.

10. The non-transitory recording medium according to claim 9, wherein the non-transitory recording medium is configured as a disc, and therein, the content and the data associated with the character string are stored together with the program.

11. A content display control apparatus, comprising:

a content obtaining section configured to obtain a content;

a character string obtaining section configured to obtain data associated with a character string which is made to correspond to the obtained content;

a line segmentation section configured to segment the character string associated with the obtained data into a line in accordance with a criterion which is determined in advance;

a line-by-line display duration time setting section configured to set a display duration time of the character string on a line-by-line basis; and a line-by-line display controller configured to sequentially superimpose and display the segmented line of the character string in accordance with the corresponding display duration time set thereby;

wherein the line-by-line display duration time setting section counts the number of characters included in the segmented line of the character string, calculates a period of time corresponding to the counted number of characters, and sets the calculated period of time as the display duration time corresponding to the segmented line of the character string, the period of time being calculated using a ratio of the counted number of characters included in the segmented line of the character string to a number of characters to be displayed for one second; and wherein, subsequent to completion of displaying of the segmented line of the character string which is made to correspond to the obtained content, the line-by-line display controller performs displaying of a different content.

12. A non-transitory recording medium including a program recorded therein, which, when executed by a processor, causes a computer to function as a content display control apparatus comprising:

a content obtaining section configured to obtain a content;

a character string obtaining section configured to obtain data associated with a character string which is made to correspond to the obtained content;

a line segmentation section configured to segment the character string associated with the obtained data into a line in accordance with a criterion which is determined in advance;

a line-by-line display duration time setting section configured to set a display duration time of the character string on a line-by-line basis; and a line-by-line display controller configured to sequentially superimpose and display the segmented line of the character string in accordance with the corresponding display duration time set thereby;

wherein the line-by-line display duration time setting section counts the number of characters included in the segmented line of the character string, calculates a period of time corresponding to the counted number of characters, and sets the calculated period of time as the display duration time corresponding to the segmented line of the character string, the period of time being calculated using a ratio of the counted number of characters included in the segmented line of the character string to a number of characters to be displayed for one second; and wherein, subsequent to completion of displaying of the segmented line of the character string which is made to correspond to the obtained content, the line-by-line display controller performs displaying of a different content.

* * * * *